United States Patent
Xiao et al.

(10) Patent No.: US 12,450,473 B1
(45) Date of Patent: Oct. 21, 2025

(54) ANTI-RADIATION LOW-LATENCY CHIP FOR NEURAL NETWORK INFERENCE ACCELERATION

(71) Applicant: Central China Normal University, Wuhan (CN)

(72) Inventors: Le Xiao, Wuhan (CN); Guoxiang Zhang, Wuhan (CN); Zijie Zhou, Wuhan (CN); Wenjie Dai, Wuhan (CN); Xiangming Sun, Wuhan (CN); Bihui You, Wuhan (CN)

(73) Assignee: Central China Normal University, Wuhan (CN)

( * ) Notice: Subject to any disclaimer, the term of this patent is extended or adjusted under 35 U.S.C. 154(b) by 0 days.

(21) Appl. No.: 19/063,390

(22) Filed: Feb. 26, 2025

(30) Foreign Application Priority Data

Dec. 26, 2023 (CN) .......................... 202311798002.5

(51) Int. Cl.
  *G06N 3/063* (2023.01)
  *G06N 3/0464* (2023.01)
(52) U.S. Cl.
  CPC .......... *G06N 3/063* (2013.01); *G06N 3/0464* (2023.01)
(58) Field of Classification Search
  None
  See application file for complete search history.

(56) References Cited

U.S. PATENT DOCUMENTS 11,966,284 B1 * 4/2024 Lameres .............. G06F 11/184

FOREIGN PATENT DOCUMENTS

| CN | 102306213 A | 1/2012 |
| CN | 102820879 A | 12/2012 |
| CN | 112116084 A | 12/2020 |

* cited by examiner

*Primary Examiner* — Kyoung Lee
(74) *Attorney, Agent, or Firm* — Bayramoglu Law Offices LLC (57) ABSTRACT

The provided is an anti-radiation low-latency chip for neural network inference acceleration. The following steps are included: deploying a neural network inference acceleration chip at a frontend of a detector, using a streaming architecture to correspond each pipeline stage to each major neural network layer, balancing a limited on-chip memory resource and support for a large-sized input, and constructing layer parallelism, channel parallelism, and convolution kernel parallelism. This application proposes to deploy an anti-radiation, low-latency, and efficient chip for convolutional neural network (CNN) inference acceleration is deployed at the frontend of the detector to improve an intelligence level of future detector hardware. To this end, a fine-grained streaming architecture, and fine-grained storage management, flexible compression and quantization, and anti-radiation digital chip design technologies are proposed to achieve a high throughput and a low on-chip memory consumption while achieving anti-radiation and low-latency inference.

6 Claims, 4 Drawing Sheets

ANTI-RADIATION LOW-LATENCY CHIP FOR NEURAL NETWORK INFERENCE ACCELERATION

CROSS-REFERENCE TO THE RELATED APPLICATIONS

This application is based upon and claims priority to Chinese Patent Application No. 202311798002.5, filed on Dec. 26, 2023, the entire contents of which are incorporated herein by reference.

TECHNICAL FIELD

The present disclosure relates to the technical field of colliders, and in particular, to an anti-radiation low-latency chip for neural network inference acceleration.

BACKGROUND

In recent years, artificial intelligence, especially deep learning, has been revolutionizing the way we interpret massive data samples generated by a collider, greatly increasing a discovery potential of current and future experiments. In particle physics, traditionally, domain expertise is used to design tools to extract most useful data features for a given measurement. When these manually designed tools are used to extract a complex problem whose features are not fully captured, information loss occurs, which may hinder a search for new physics. Just as in the fields of computer vision and natural language processing, the field of particle physics is increasingly striving to skip a feature engineering step and instead uses complete high-dimensional feature space to train a deep neural network (DNN), especially a convolutional neural network (CNN). As a powerful DNN that has achieved superhuman performance in a plurality of fields, the CNN is inspired by an animal visual cortex, where a single neuron only processes information from a partial field of view. This "divide-and-conquer" strategy simplifies a neural network architecture and helps achieve translation and rotation invariance and other functions. A CNN algorithm has become a state-of-the-art technology in offline analysis for applications such as particle recognition, jet tagging, pile-up suppression, track reconstruction, event and collision classification, and anomaly detection for new physics. Similarly, some studies have begun to shift a neural network algorithm from the offline analysis to online triggering. On one hand, traditional triggering and reconstruction algorithms not only significantly slow down under a high pile-up condition, but also undergo performance degradation. A neural network may be the only hope for performing real-time and efficient reconstruction. On the other hand, a more complex neural network algorithm in a trigger will allow a high-energy physics experiment to preserve a rare event that is originally not selected, while meeting a strict robustness requirement of an irreversible decision system. Usually, a graphics processing unit (GPU) is a standard tool for processing the neural network because it can simultaneously perform a large number of floating-point operations. There have also been some chips that perform inference acceleration with a low power consumption, such as NVDLA provided by Nvidia, TPU provided by Google, and Cambricon provided by Cambrian. They all adopt a single-computing-engine architecture. This architecture includes a powerful computing engine, which is typically structured as a systolic array of processing elements (PEs) or a matrix multiplication unit, to sequentially execute CNN layers. The layers in the neural network perform inference by using the computing engine in a time-sharing manner under software control of a central processing unit (CPU). This design has strong versatility and high flexibility, but sacrifices efficiency due to its processor-like control mechanism. Some neural network accelerators based on a field-programmable gate array (FPGA) also adopt this architecture, such as Angel-Eye and DNNWeaver, and others adopt a streaming architecture, such as fpgaConvNet and HADDOC2. The streaming architecture usually consists of different hardware blocks in each layer of a target CNN, where each block is optimized separately and then all blocks are connected to form a pipeline. When data flows in the architecture, the data is processed through different parts of the neural network. Although some of these accelerators can achieve a very high throughput, they do not meet a sub-microsecond inference latency requirement unique to the particle physics because they are oriented to different applications.

In order to apply low-latency inference in the field of online triggering in high-energy physics, there is an early attempt to deploy a low-latency CNN on the FPGA by using the streaming architecture. An HLS4ML compiler is also developed, which takes a neural network model as an input, generates C/C++ code, and then uses a Vivado high level synthesis (HLS) tool to translate the C/C++ code into xilinx FPGA firmware, thereby further expanding the HLS4ML. The streaming architecture is used to support low-latency deployment of the CNN on the FPGA. However, due to use of the HLS tool, the HLS4ML cannot deeply optimize design details to reduce an inference latency, and instead on-chip deployment is performed on the entire neural network including a weight to reduce an overall inference latency by avoiding a latency overhead caused by data transmission with an off-chip memory. This method limits a model size and complexity that the HLS4ML can support, and neither an inference accelerator based on the FPGA nor a commercial inference acceleration chip can operate in a frontend radiation environment of a detector. Therefore, the present disclosure proposes an anti-radiation low-latency chip for neural network inference acceleration to solve the existing problems in the prior art.

SUMMARY

In order to solve the above problems, the present disclosure provides an anti-radiation low-latency chip for neural network inference acceleration. The anti-radiation low-latency chip for neural network inference acceleration is deployed at a frontend of a detector in high-energy and high-brightness particle physics experiments to enhance an intelligence level of the detector, which opens up a new possibility for exploring a new high-performance and low-cost detector architecture in the future.

In order to achieve the objective of the present disclosure, the present disclosure is implemented by the following technical solutions: An anti-radiation low-latency chip for neural network inference acceleration includes:
  a plurality of sequentially connected streaming architecture units configured to implement computations for different neural network layers; and
  an external storage unit configured to store a weight of an entire neural network.
Further, each of the streaming architecture units includes:
  a reshaping buffer configured to store a slice of an input feature map (InFM) or a feature map slice output by a preceding neural network layer;

a neural network subunit configured to implement a plurality of computing engines and capable of completing a parallel computation for a convolutional layer or a fully connected layer, where the convolutional layer and the fully connected layer use a same loop structure, and therefore employ a parallel computation strategy; and a weight buffer connected to the external storage unit and configured to extract a weight required for computing a current feature map slice from an external memory.

Further, a streaming architecture consumes three types of resources: a computing resource, an on-chip memory, and the external memory; and the streaming architecture has two data paths, where one path is used to horizontally transfer the InFM to a computing unit, and the other path is used to vertically transfer a weight to the computing unit.

Further, the neural network subunit includes:

a plurality of parallel computing engines configured to implement parallel acceleration for a convolution computation or a fully connected computation, where input data of each of the parallel computing engines comes from the feature map slice and the weight.

Further, in the parallel computation, parallelism comes from six dimensions, specifically includes:

batch parallelism is to simultaneously group a plurality of image frames into batches to reuse a weight in each layer and minimize an external memory access;

layer parallelism is achieved in a pipeline manner by starting an $(N+1)^{th}$ layer before ending execution of an $N^{th}$ layer, parallelizes main layers, and merges a remaining layer into the main layers, thereby reducing a quantity of pipeline stages to lower a latency, and realizing a parameterized register transfer level (RTL) design;

unrolling of recurrent computations across four levels in the convolutional layer provides four additional concurrent sources, and loop unrolling of the fully connected computation is similar thereto: a convolution kernel loop Loop-4, an input channel loop Loop-3, a loop Loop-2 for a scanning operation along an input width and height, and a loop Loop-1 for a multiply-accumulate operation within a convolution kernel window, where in order to reduce an overhead of the computing resource, two outer-layer computation loops of the convolutional layer are capable of being unrolled in parallel, namely the convolution kernel loop Loop-4 and the input channel loop Loop-3, because unfolding of loops of two inner layers requires caching a complete feature map for each pipeline stage, which not only increases an on-chip buffer but also increases a latency of each pipeline stage; and the unrolling of the two outer-layer computation loops only requires caching the slice of the InFM to start a pipeline to perform a convolution operation;

convolution kernel parallelism is to extract a plurality of convolution kernels from the weight at a time and compute the convolution kernels and a feature map in parallel; and input channel parallelism is to extract a plurality of data channels from the InFM at a time and compute the data channels and the convolution kernel in parallel.

Further, for the parallel unrolling of the two outer-layer computation loops of the convolutional layer, namely the convolution kernel loop Loop-4 and the input channel loop Loop-3, two parameters are defined: a kernel parallelism factor (KPF) and a channel parallelism factor (CPF), which respectively represent quantities of convolution kernels and input channels that are processed within a pipeline stage, such that the computing engine implements a two-dimensional parallelism scheme and adjusts a resource overhead of each pipeline stage, where the computing engine includes a plurality of processing elements (PEs), each of the PEs is configured to process an InFM with CPF channels, and a quantity of PEs in the computing engine is determined by the KPF; a high-performance low-overhead parameterized RTL-level intellectual property (IP) is constructed for the computing engine in a hardware-centric bottom-up manner; and the neural network layer is constructed based on the IP to determine impacts of different CPFs and KPFs on an inference latency, a throughput, and a hardware overhead.

Figure 3:
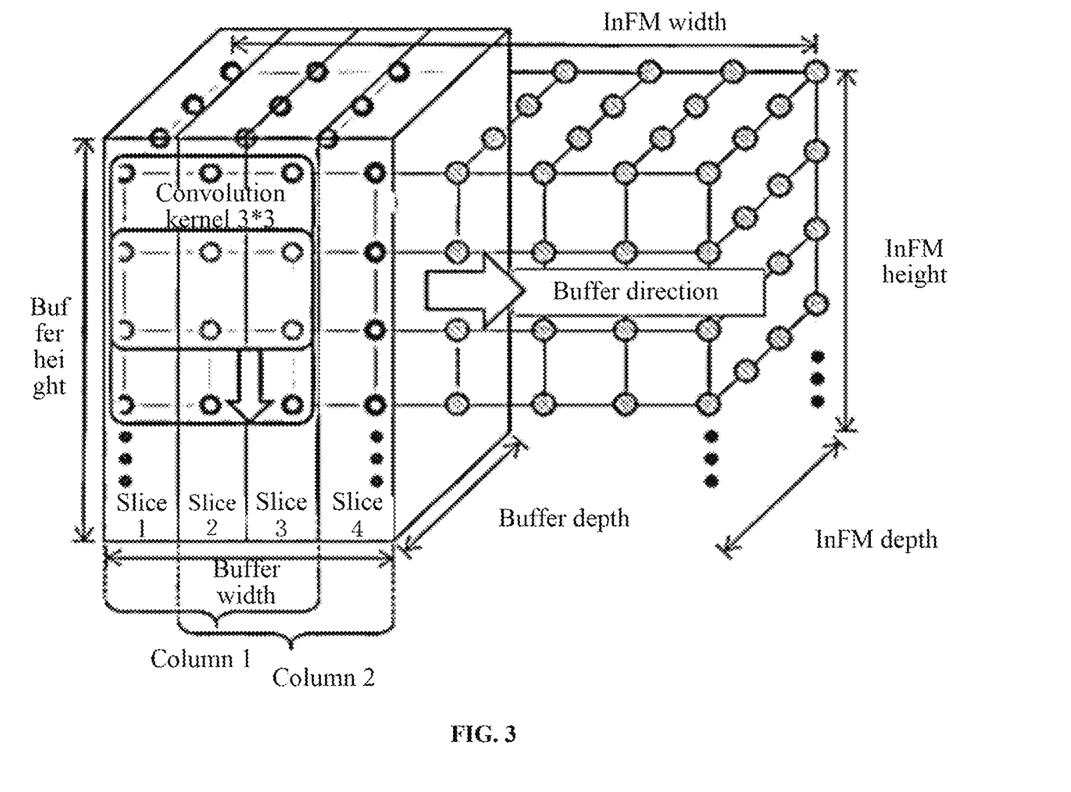
FIG. 3 is a schematic diagram of a column-based caching scheme according to the present disclosure.

Further, a caching method based on a fine-grained column specifically includes:

retaining a part of the InFM on the chip and caching at least two "columns" before the computation, where taking a convolution operation with a convolution kernel size of 3 and a stride of 1 as an example, as shown in FIG. 3, since slices 1 to 3 are used for a first sliding window operation (from top to bottom), the first three slices are named as a first column; and similarly, a second column represents data of a second sliding window operation, so slices 2 to 4 form the second column;

executing, by the convolution kernel immediately after completing a first vertical sliding window operation, a second vertical sliding window operation; and after freeing up space occupied by a first slice, starting to cache a next slice to form a next "column", where a size required for the reshaping buffer is equal to a size of two "columns", such that the slice is cached in a fine-grained column manner to save on-chip memory and improve performance of a layer with a low computation-to-communication (CTC) ratio.

Further, an adaptive hierarchical storage method specifically includes: inserting a buffer between a computationally intensive IP array and the external memory, where the weight buffer is configured to continuously cache a weight in a dynamic random access memory (DRAM), provide an optional ping-pong buffer at an input end of each layer, and generate a ping-pong buffer when a required weight exceeds a certain threshold; and further, performing network compression by using parameter pruning, low-rank decomposition, a compact convolutional filter, and knowledge distillation jointly, where the parameter pruning selectively removes a parameter based on specific sorting and regularization, and is specifically amplitude-based pruning, which includes eliminating a redundant weight in a weight tensor by setting a minimum weight value in the tensor to 0; the low-rank decomposition is to estimate an information parameter through matrix decomposition; the compact convolutional filter uses a convolutional filter with a special structure to store the parameter; and the knowledge distillation trains a compact network by using knowledge extracted from a large network.

Further, network quantization is further included to transfer an input, a weight, a bias, a sum, and an output of each layer from a floating point to a fixed point to reduce a bit width, and a fixed-point operation is performed to reduce implementation complexity, and save a resource for signal routing, as well as a resource and a latency for a mathematical operation; and the network quantization specifically includes post-training quantization (PTQ) and quantization-aware training (QAT), where the PTQ quantizes a trained network before the trained network is deployed on an inference accelerator, and is used to apply same quantization to the entire network or set precision of each layer and each parameter type, namely heterogeneous quantization; and the QAT is used to limit a performance loss while reducing numerical precision of a network component, where during training, a quantized weight and bias are used in forward propagation and full precision is used in backward propagation, to drift towards an optimal point during loss minimization.

Further, an anti-radiation design is incorporated into chip implementation. An anti-radiation module is configured to separately take a measure for a total ionizing dose (TID) of radiation and a single event effect (SEE), and includes:

a TID mitigation submodule configured to adopt an advanced-node complementary metal-oxide-semiconductor (CMOS) technology, where because an average time latency of all standard cells in a 65 nm CMOS technology library increases after 200 Mrad irradiation, during the chip implementation, except for the advanced-node CMOS technology, a minimum-sized standard cell should not be used; a worst-case library provided by a foundry is used to simulate an impact of radiation damage; and concurrent multi-mode multi-corner static timing analysis is performed to ensure timing performance and reserve a greater timing margin; and a SEE mitigation submodule serving as a critical step of the chip implementation and configured to achieve effective performance in a radiation environment at a frontend of a detector, where triple modular redundancy (TMR) is a well-known technology to protect a digital circuit from an adverse impact of the SEE; two different TMR modules are used for the implementation: a simple TMR module with a triple register and a majority voter, and a complete TMR module, where all combinational logic within the complete TMR module is triple, all combinational logic signals are used as input signals of three majority voters, and outputs of the three majority voters are used as inputs of the triple register; a feedback output from the register is capable of being automatically corrected; an automatic correction function is not required for a control path whose state is regularly refreshed and input data that periodically arrives at the chip, to reduce the hardware overhead; and the automatic correction function is used for critical data that is not refreshed for a long time after being configured or loaded to ensure that a register error caused by a single event upset is not accumulated over time.

The present disclosure has the following beneficial effects:

The present disclosure proposes to deploy an anti-radiation, low-latency, and efficient chip for CNN inference acceleration at a frontend of a detector to improve an intelligence level of future detector hardware. A design of finely controlling an inference acceleration chip in a hardware-centric bottom-up manner is adopted, and to this end, a fine-grained streaming architecture, and fine-grained storage management, flexible compression and quantization, and anti-radiation digital chip design technologies are proposed to achieve a high throughput and a low on-chip memory consumption while achieving anti-radiation and low-latency inference. In this way, a next-generation new intelligent detector can implement real-time analysis triggering based on a neural network algorithm at the frontend. This improves an ability to find a new physical feature, reduces a detector cost, a power consumption, and a material budget, and opens up a wide range of possibilities for exploring a new low-cost and high-performance detector architecture in the future, thereby accumulating valuable experience for core and cutting-edge technologies of the anti-radiation and low-latency chip for neural network inference acceleration.

DETAILED DESCRIPTION OF THE EMBODIMENTS

In order to deepen the understanding of the present disclosure, the present disclosure will be described in further detail below in conjunction with embodiments, but these embodiments are only used to explain the present disclosure and do not constitute a limitation on the protection scope of the present disclosure.

Embodiment 1

This embodiment provides an anti-radiation low-latency chip for neural network inference acceleration, and the following steps are included:

deploying a neural network inference acceleration chip at a frontend of a detector, using a streaming architecture to correspond each pipeline stage to each major neural network layer, balancing a limited on-chip memory resource and support for a large-sized input, building batch parallelism and layer parallelism, and improving a throughput by enhancing parallelism;

abstracting a same loop structure in a convolutional layer and a fully connected layer as a computing engine, unrolling two outer-layer computation loops of the convolutional layer, defining a KPF and a CPF, and combining a low latency and a low hardware overhead to achieve a two-dimensional parallelism scheme of convolution kernel parallelism and channel parallelism;

performing storage management by using a column-based caching scheme and an adaptive hierarchical storage system, in order to reduce on-chip memory used to store an InFM and cache weight data, thereby improving storage utilization efficiency;

performing network compression to reduce an operation quantity and a model size of a DNN, and performing network quantization to reduce precision of a computation and an operand in the neural network without sacrificing performance;

managing a CMOS technology, simulating an impact of radiation damage by using a worst-case library provided by a foundry, and performing concurrent multi-mode multi-corner static timing analysis to ensure timing performance and reserve a greater timing margin; and in chip implementation, performing protection by using a simple TMR module and a complete TMR module, where all combinational logic within the complete TMR module is triple, is used by three majority voters, and forms an input for a triple register; and a feedback output from the register is automatically corrected.

The present disclosure proposes for the first time to deploy an anti-radiation low-latency chip for neural network inference acceleration at a frontend in high-energy and high-brightness particle physics experiments to enhance an intelligence level of the detector, which opens up a new possibility for exploring a new high-performance and low-cost detector architecture in the future.

The present disclosure proposes for the first time a fine-grained streaming architecture and fine-grained memory management, flexible compression and quantization, and other technologies for designing a neural network inference acceleration chip, which significantly reduces an inference latency while maintaining a high throughput and a low hardware overhead, to meet a low-latency application requirement of the frontend of the detector.

The present disclosure implements for the first time the anti-radiation low-latency chip for neural network inference acceleration in the field of high-energy physics. Off-chip neural network weight data is configured, such that this neural network acceleration chip can deploy unique neural network algorithms for different tasks at the frontend of the detector.

Embodiment 2

As shown in FIG. 1, FIGS. 2A-2D, and FIG. 3, this embodiment provides an anti-radiation low-latency chip for neural network inference acceleration.

A CNN is mainly constituted by a convolutional layer, a pooling layer, an activation layer, a normalization layer, and a fully connected layer, where the convolutional layer is most important in the CNN. The convolutional layer can be thought of sliding a small window (which is referred to as a filter or a convolution kernel, with a channel quantity being C, a width being w, and a height being h) on an image (which is referred to as an InFM, with a channel quantity being C, a width being W, and a height being H) to perform a convolution operation to generate a smaller matrix than the original image as an output feature map. A parameter of the convolution kernel is referred to as a weight, which is obtained through training. Each convolution kernel is dedicated to detecting a specific type of feature or shape at a spatial location in an input. One channel that generates the output feature map requires one convolution kernel whose channel quantity is equivalent to the channel quantity of the InFM. A corresponding channel of the convolution kernel processes a corresponding input channel. First, an element at a location in each channel of the convolution kernel is multiplied by an element at the corresponding location in the corresponding input channel, and then all products are added together. Finally, a sum of results of all channels is computed as an element value of an output channel. Then the convolution kernel is slid from left to right and top to bottom to repeat the above computation to generate each element value of the output channel. Then all convolution kernels are traversed, and the above computation process is repeated to generate an output channel quantity equal to a quantity of convolution kernels. That is, the channel quantity of the convolution kernel is equal to a quantity of input channels, and a quantity of output channels is equal to the quantity of convolution kernels. In summary, the convolution operation includes four levels of loops: a convolution kernel loop (Loop-4), an input channel loop (Loop-3), a loop for a scanning operation along an input width and height (Loop-2), and a loop for a multiply-accumulate operation within a convolution kernel window (Loop-1). The convolutional layer also has two additional architectural parameters, which are referred to as padding and stride. The stride determines a step size of the convolution kernel from left to right and from top to down, while the padding determines how an edge is processed.

The pooling layer, also known as a downsampling layer, is used to gradually reduce spatial dimensions of a representation, thereby reducing parameters and a computational amount in the network. The pooling layer is periodically inserted between consecutive convolutional layers. The pooling layer performs an operation independently on each input channel, and uses a certain strategy, such as a "maximization", "averaging", or "minimization" operation, to adjust a size spatially of each input channel. A pooling layer with a 2×2 window is most commonly used, and four samples are collected, thereby discarding 75% of the input. The activation layer provides a nonlinearity that functions similarly to an action potential in an animal neuronal cell. If a neuron emits an action potential, the neuron is activated. Commonly used nonlinear activation functions are an S-shaped function sigmoid and a hyperbolic tangent function tanh. A recently proposed and commonly used activation function is a rectified linear unit (ReLU), where a negative value is set to 0 and a positive value remains unchanged. The ReLU converges faster during training and has lower computational complexity than the standard sigmoid and tanh functions. A function of the normalization layer is similar to a "lateral inhibition" phenomenon in an animal nerve, which refers to an ability of an excited neuron in inhibiting its adjacent neuron, thereby forming a contrast in that region. In order to achieve this, normalization is used in the CNN. The normalization layer detects a high-frequency feature with a large response. If a neighborhood of the excited neuron is normalized, the excited neuron becomes more sensitive than its neighbor. Basically, the normalization layer performs some kind of inhibition and enhances a neuron with a relatively large activation. The fully connected layer, also known as an inner product layer or a dense layer, has a neuron that is fully connected to all activations in a previous layer, and thus gets its name. An input feature of the fully connected layer is matrix-multiplied with a set of weights, and then an offset is applied through a set of biases.

CNN inference has a high memory requirement and high computational complexity. A computational load mainly includes a large number of multiply-accumulate operations of the convolutional layer, which typically account for over 90% of a total quantity of operations of the CNN. Contrary to the computation, most weights of the CNN are included in the fully connected layer. Such an unbalanced computation-to-memory ratio also makes it difficult to design a CNN accelerator. The present disclosure will achieve efficient inference with a low latency, a high throughput, and a low hardware overhead by selecting different levels of computing parallelization strategies, storage strategies, and compression and quantization strategies, and adopt an anti-radiation design technology to implement the chip.

(1) Design and Implementation of a Fine-Grained Streaming Architecture

The fine-grained streaming architecture can provide the high throughput, the low latency, and the low hardware overhead. In order to overcome a startup latency of a pipeline (time between loading of a first input in a first pipeline stage and generation of a first output in a last pipeline stage) and a large inter-stage caching overhead, a fine-grained pipeline structure design is adopted, including a top-level architecture design and a computing engine design.

Top-level architecture design. Firstly, an architecture design needs to balance a limited on-chip memory resource and support for a large-sized input. A single-computing-engine architecture either requires a high memory bandwidth to exchange an intermediate result with an external memory (DRAM), or requires a large-capacity on-chip memory to store all feature maps. In addition, the large-sized input further increases a hardware overhead, generates a larger feature map, and requires more memory. Secondly, the streaming architecture can implement an optimized design specific to each layer based on computing and memory requirements. In contrast, the single-computing-engine architecture only has one powerful computing engine. This means that an operation transferred into the neural network needs to be transformed (for example, padded, matched, or partitioned) by a CPU before being input into the computing engine, which reduces efficiency and introduces a significant latency. Thirdly, the streaming architecture can effectively adjust resource allocation of each layer and provide high-throughput performance to better support an input data stream.

Figure 1:
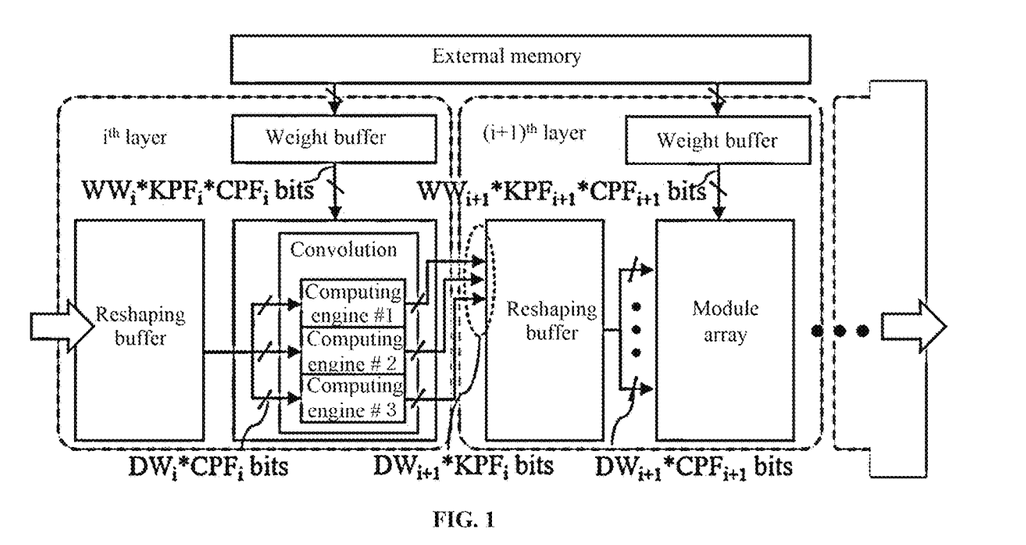
FIG. 1 is schematic diagram of two pipeline stages in a top-level architecture according to the present disclosure.

The present disclosure adopts the streaming architecture, and each pipeline stage corresponds to each major neural network layer. FIG. 1 shows an example of two pipeline stages of the proposed top-level architecture to compute two convolutional layers (an $i^{th}$ layer and an $(i+1)^{th}$ layer). This design consumes three types of resources: a computing resource (Computing Engine), an on-chip memory (Reshape Buffer and Weight Buffer), and the external memory. There are two data paths for horizontally transferring the InFM to a computing unit and vertically transferring a trained weight to the computing unit. In order to supply sufficient data, two buffers are disposed for each pipeline stage, which serve as a reshaping buffer for storing a slice of the InFM and a weight buffer for extracting a weight from the external memory.

The accelerator typically increases a throughput by improving parallelism, and the parallelism comes from six dimensions. Batch parallelism is to simultaneously group a plurality of image frames into batches to reuse a weight in each layer and minimize an external memory access. Layer parallelism is achieved in a pipeline manner by starting the $(N+1)^{th}$ layer before ending execution of the $N^{th}$ layer. Unrolling of recurrent computations across four levels in the convolutional layer provides four additional concurrent sources. Complete concurrency of these six dimensions implies an unacceptable hardware overhead and low efficiency. A trade-off between a latency, a throughput, and a resource overhead depends on reasonable parallelization of inference computations. The top-level architecture design focuses on optimization of the batch parallelism and the layer parallelism. An inference application at a frontend of a detector requires real-time processing of a stream input. This limits an ability to perform batch processing on data to improve the throughput, because an additional latency generated by the batch processing may exceed a range allowed by a real-time performance requirement. The layer parallelism can also improve the throughput, but more pipeline stages lead to a greater inference latency. One strategy is to parallelize main layers, such as the convolutional layer and the fully connected layer, which contribute to computation and memory consumptions. The remaining layers (such as the normalization layer, the pooling layer, and the activation layer) are merged into the main layers to reduce a quantity of pipeline stages to lower the latency. In the top-level architecture design, reasonable batch parallelism and layer parallelism are explored, a parameterized RTL design is implemented, and impacts of different batch parallelism and layer parallelism on the inference latency, the throughput, and the hardware overhead are studied.

Computing engine design. Core functions of the CNN inference accelerator are implemented by parameterized RTL network components (such as CONV, FC, Pooling, BN, and Relu). These components are IPs for constructing the entire network. The convolutional layer and the fully connected layer usually use a same loop structure, and therefore are abstracted as one computing engine. A strategy for unrolling the recurrent computations across the four levels in the convolutional layer is considered in the computing engine design. In order to reduce an overhead of the computing resource, the computing engine proposed in the present disclosure focuses on unfolding of two outer-layer computation loops of the convolutional layer, namely the convolution kernel loop (Loop-4) and the input channel loop (Loop-3). Because unfolding of loops of two inner layers requires caching a complete feature map for each pipeline stage, which not only increases an on-chip buffer but also increases a latency of each pipeline stage. The unrolling of the two outer-layer computation loops only requires caching the slice of the InFM to start the pipeline to perform the convolution operation. Therefore, two parameters are defined: a KPF and a CPF. The KPF and the CPF respectively represent quantities of convolution kernels and input channels that can be processed within a pipeline stage. These two factors allow the computing engine to implement a two-dimensional parallelism scheme and adjust a resource overhead of each pipeline stage.

Figure 2:
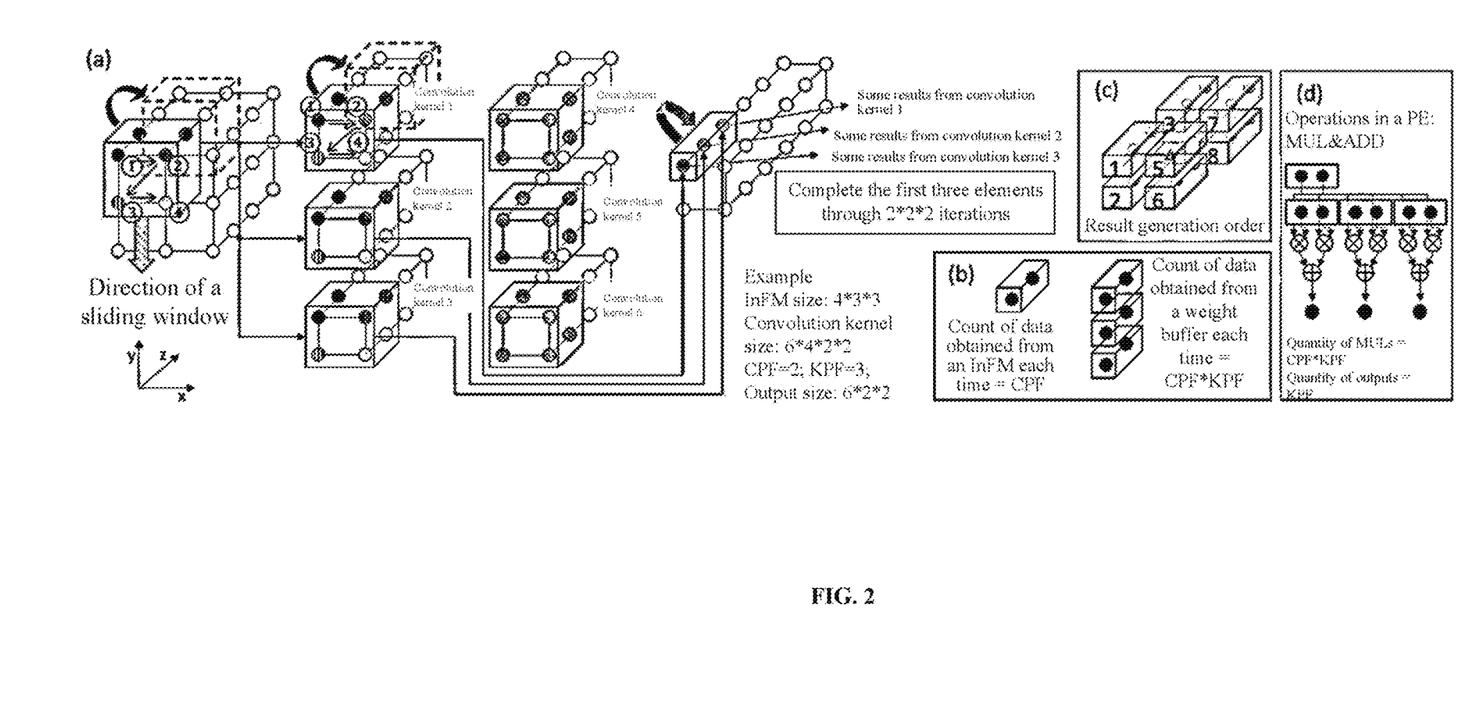
FIGS. 2A-2D show an example of parallel unrolling of a computing engine according to the present disclosure.

The computing engine is constituted by a plurality of PEs. The PE is designed to process an InFM with CPF channels, and a quantity of PEs in the computing engine is determined by the KPF. In order to better explain how the computing engine is calculated in parallel, a small-sized convolutional layer is taken as an example for research, as shown in FIGS. 2A-2D. It is assumed that there is a 4×3×3 InFM (on a left side of FIG. 2A), which is processed by six 4×2×2 convolution kernels (in the middle of FIG. 2A). Both the feature map and the convolution kernel have four channels, the CPF is 2, and the KPF is 3 (total parallelism: 2×3=6). Because CPF=2 and a convolution kernel size is 2×2, a cube with two elements along X, Y, and Z dimensions is considered as a block. Each block needs to undergo four processing steps according to numbers 1 to 4, as each step only processes one pixel in an X-Y plane. In each step, two segments of data (along a Z-axis, corresponding to the CPF) are collected from the InFM and processed simultaneously by the first three of the six convolution kernels (corresponding to the KPF). A total of six multiply-accumulate operations (equal to CPF×KPF) are performed in parallel, and the first three calculation results are generated. Input data required for three PEs in one step is show in FIG. 2B. Two elements are extracted from the InFM, while six elements are extracted from the weight. The reshaping buffer and the weight buffer provide the data separately through a single memory access. In this example, an output order is shown in FIG. 2C, with indices from 1 to 8. The first three convolution kernels produce outputs 1, 2, 5, and 6, while the remaining three convolution kernels produce outputs 3, 4, 7, and 8. A multiply-accumulate operation in the computing engine when CPF=2 and KPF=3 is shown in FIG. 2D.

According to the above idea, the computing engine design is to finely design high-performance low-overhead parameterized RTL-level IPs in a hardware-centric bottom-up manner. A high-quality neural network layer is constructed based on these high-quality IPs, and impacts of different CPFs and KPFs on the inference latency, the throughput, and the hardware overhead are studied.

(2) Design and Implementation of the Fine-Grained Storage Management

Storage management mainly adopts two technologies: a column-based caching scheme and an adaptive hierarchical storage system, to reduce on-chip memory used to store the InFM and cache weight data, thus improving storage utilization efficiency.

Column-based caching scheme. When a size of an input image is small, some accelerators cache an entire InFM onto the chip to achieve a higher throughput and avoid complex data movement. When a size of an input image is large, a feature map in the neural network is huge and cannot be fully stored on the chip. Although downsampling can alleviate this problem to some extent, it is not always acceptable, especially for detecting a small target.

To solve this problem, a new column-based caching scheme is proposed, which only retains a part of the InFM on the chip. FIG. 3 shows a convolution with a kernel size of 3 and a stride of 1. Since slices 1 to 3 are used for a first sliding window operation (from top to bottom), the first three slices are named as a first column. Similarly, a second column represents data of a second sliding window operation, so slices 2 to 4 form the second column. This design scheme caches at least two columns before starting the computation. This allows the convolution kernel to immediately execute a second vertical sliding window operation after completing a first vertical sliding window operation. Caching one additional column will not cause a latency due to a data shortage. In addition, after space occupied by the slice 1 is freed up, a slice 5 is cached to form a next column (slices 3 to 5). Therefore, a size required for the reshaping buffer shown in FIG. 1 is equal to a size of two columns (four slices). For most input images, their height values are less than their width values. Therefore, the present disclosure caches slices in a column manner by default to save the on-chip memory, or may configure a row-based caching method based on actual situations. The column-based caching scheme can also effectively improve performance of a layer with a low CTC ratio, such as the fully connected layer and a convolutional layer with a small InFM. Herein, according to the proposed scheme, a flexible and configurable RTL-level design (such as a configuration of a slice caching method) is first implemented, and then requirements of layers with different CTC ratios for the size of the reshaping buffer are studied, in order to adjust the size of the reshaping buffer for different layers in the network.

Adaptive hierarchical storage system. In order to reduce a latency of accessing off-chip weight data, the present disclosure provides the adaptive hierarchical storage system, which can insert a buffer between a computationally intensive IP array and the external memory (as shown in FIG. 1). The weight buffer is used to continuously cache a weight in a DRAM. In addition, an optional ping-pong buffer is provided at an input end of each layer. Once a required weight exceeds a certain threshold, a ping-pong buffer is generated to overcome a data shortage problem when data is retrieved from the external memory.

(3) Compression and Quantization

In addition to the efficient accelerator architecture and storage system, compression and quantization techniques can also further improve efficiency of neural network inference.

Compression. Network compression can reduce an operation quantity and a model size of a DNN. Due to potential redundancy of synapses and neurons in the neural network, the compression technique attempts to reduce their total quantity, thereby effectively reducing a multiplier. An effective method is parameter pruning, which selectively removes a parameter based on specific sorting and regularization. One strategy is amplitude-based pruning, which eliminates a redundant weight in a weight tensor by setting a minimum weight value in the tensor to 0. There are also some other network compression methods, including low-rank decomposition (which estimates an information parameter through matrix decomposition), a compact convolutional filter (which uses a convolutional filter with a special structure to store the parameter), knowledge distillation (which trains a compact network by using knowledge extracted from a large network), and the like. This patent combines a plurality of technologies to achieve optimal compression performance.

Quantization. During network training, a single-precision or double-precision floating-point operation is typically relied upon. However, in a network inference process, optimal performance can be usually achieved without a need to perform a 32-bit floating-point or 64-bit full-precision computation. The quantization can significantly reduce precision (weights, biases, and the like) of a computation and an operand in the neural network without sacrificing performance. An input, a weight, a bias, a sum, and an output of each layer can be transferred from a floating point to a fixed point, reducing a bit width. The fixed-point operation can greatly reduce implementation complexity, thereby saving a resource for signal routing, as well as a resource and a latency for a mathematical operation.

A trained network is quantized before being deployed on the inference accelerator, which is known as PTQ. Same quantization may be applied to the entire network, or precision of each layer and each parameter type may be set (namely heterogeneous quantization). Typically, extreme PTQ can result in a significant precision loss. A balance between an amount of compression and model precision needs to be achieved, and how much reduction in the model precision can be tolerated is an application specific issue. QAT can limit a performance loss while reducing numerical precision of a network component. During the training, a quantized weight and bias are used in forward propagation and full precision is used in backward propagation, to drift towards an optimal point during loss minimization.

The present disclosure studies these two network quantization methods and compares impacts of different methods on network performance under different quantization bit widths. Based on this, the compression method and the quantization method are further studied jointly. For example, impacts of the compression method on the model precision and robustness are studied under different quantization bit widths. Usually, for a large bit width, the compression has a very little impact on the model precision. However, under an extremely low bit width, the compression imposes a negative impact on model performance. Therefore, it is necessary to find an optimal joint compression and quantization scheme. In addition, the inference accelerator proposed in this patent will allow different numerical precision to be specified for different components of the network. As shown in FIG. 1, DWi represents a bit width of input data of an $i^{th}$ layer, while WWi represents a bit width of a weight. Moreover, a flexible quantization configuration is supported at various levels such as the top-level architecture design, the computing engine design, the storage management design, and the parameterized RTL-based component IP design.

(4) Design and Implementation of an Anti-Radiation Digital Chip

Herein, different measures are taken for a TID and a SEE respectively to improve radiation resistance of the chip.

TID mitigation. A measurement result in references indicates that an average time latency of all standard cells in a 65 nm CMOS technology library increases after 200 Mrad irradiation. During the chip implementation, except for the advanced-node CMOS technology, a minimum-sized standard cell should not be used. A worst-case library provided by a foundry is used to simulate an impact of radiation damage. Concurrent multi-mode multi-corner static timing analysis is performed to ensure timing performance and reserve a greater timing margin.

Figure 4A:
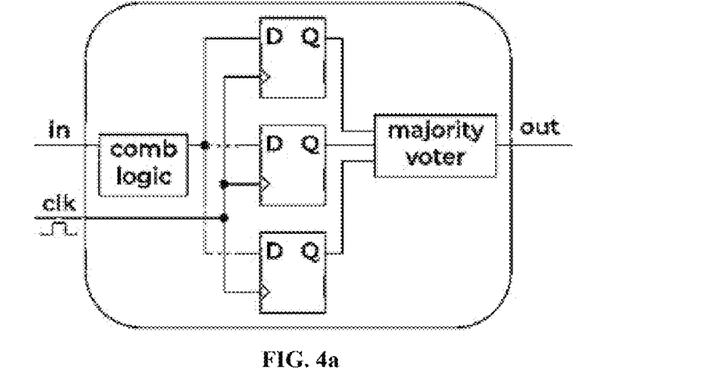
FIG. 4A is a schematic diagram of a simple TMR module according to the present disclosure.
Figure 4B:
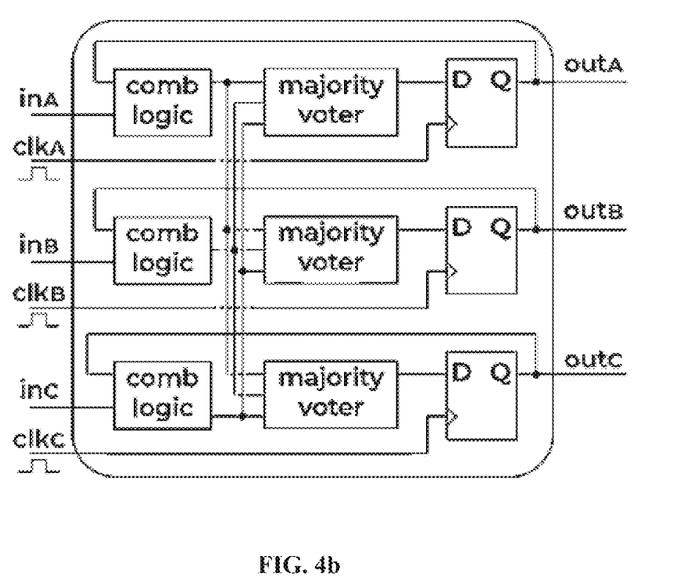
FIG. 4B is a schematic diagram of a complete TMR module according to the present disclosure.

SEE mitigation. The SEE mitigation is a critical step of the chip implementation to achieve effective performance in a frontend environment of the detector. TMR is a well-known technology to protect a digital circuit from an adverse impact of the SEE. Two different TMR modules are used for the implementation: a simple TMR module with a triple register and a majority voter, as shown in FIG. 4A, and a complete TMR module, as shown in FIG. 4B. All combinational logic within the complete TMR module is triple, all combinational logic signals are used as input signals of three majority voters, and outputs of the three majority voters are used as inputs of the triple register. A feedback output from the register can be automatically corrected. An automatic correction function is not required for some control paths whose states are regularly refreshed and input data that periodically arrives at the chip, to reduce the hardware overhead. The automatic correction function is used for critical data that is not refreshed for a long time after being configured or loaded to ensure that a register error caused by a single event upset is not accumulated over time.

The present disclosure proposes to deploy the anti-radiation, low-latency, and efficient chip for CNN inference acceleration at the frontend of the detector to improve an intelligence level of future detector hardware. The design of finely controlling the inference acceleration chip in the hardware-centric bottom-up manner is adopted, and to this end, the fine-grained streaming architecture, and the fine-grained storage management, flexible compression and quantization, and anti-radiation digital chip design technologies are proposed to achieve the high throughput and the low on-chip memory consumption while achieving anti-radiation and low-latency inference. In this way, a next-generation new intelligent detector can implement real-time analysis triggering based on a neural network algorithm at the frontend. This improves an ability to find a new physical feature, reduces a detector cost, a power consumption, and a material budget, and opens up a wide range of possibilities for exploring a new low-cost and high-performance detector architecture in the future, thereby accumulating valuable experience for core and cutting-edge technologies of the anti-radiation and low-latency chip for neural network inference acceleration, and providing technical support for constructing international scientific facilities, carrying out large-scale international cooperative experiments, and promoting development of related fields of the national economy in the future.

The fine-grained streaming architecture in the present disclosure can provide the high throughput and the low hardware overhead while achieving the low latency, including the top-level architecture design and the computing engine design. The limited on-chip memory resource and the support for the large-sized input is balanced through the top-level architecture design, and the reasonable batch parallelism and layer parallelism are implemented in the top-level design to improve the throughput by enhancing the parallelism. Considering the low latency and hardware overhead, the computing engine implements the two-dimensional parallelism scheme of the convolution kernel parallelism and the channel parallelism.

The fine-grained storage management in the present disclosure mainly adopts the two technologies: the column-based caching scheme and the adaptive hierarchical storage system. The column-based caching scheme caches the slice of the InFM instead of the entire InFM on the chip, thereby saving the on-chip memory and reducing a latency caused by caching more data. A small quantity of slices are cached in advance, thereby avoiding the latency caused by the data shortage. The adaptive hierarchical storage system inserts the buffer between a computationally intensive array and the external memory to reduce the latency of accessing the off-chip weight data and generate the ping-pong buffer when necessary.

The flexible compression and quantization in the present disclosure are used to further improve the efficiency of the neural network inference. The network compression can reduce a size of a neural network model by removing a redundant network branch and other methods. The quantization can significantly lower the precision of the computation and the operand in the neural network and maintain the performance of the neural network. Bit widths of different parts of the neural network are reduced through the PTQ, the QAT, and other methods, and the implementation complexity is greatly reduced, thereby saving an overhead for a signal path and the resource and latency for the mathematical operation in the neural network accelerator.

In the present disclosure, in order to ensure reliability of a frontend circuit of the detector in a high radiation environment, the anti-radiation digital chip design adopts different measures to mitigate the TID and the SEE. Considering that the average time latency of all the digital standard cells increases after the irradiation, it is necessary to avoid using the minimum-sized cell when implementing the chip and reserve a sufficient timing margin for the circuit, such that the circuit operates normally throughout an entire experimental life. The SEE mitigation adopts two TMR technologies with different specifications to minimize the hardware overhead while providing protection.

The above shows and describes the basic principles, main features, and advantages of the present disclosure. It should be understood by those skilled in the art that, the present disclosure is not limited by the above embodiments, and the above embodiments and the description only illustrate the principle of the present disclosure. Various changes and modifications may be made to the present disclosure without departing from the spirit and scope of the present disclosure, and such changes and modifications all fall within the claimed scope of the present disclosure. The claimed protection scope of the present disclosure is defined by the appended claims and equivalents thereof.

What is claimed is:

1. An anti-radiation low-latency chip for neural network inference acceleration, wherein the anti-radiation low-latency chip for the neural network inference acceleration is deployed at a frontend of a detector, and comprises:
- a plurality of sequentially connected streaming architecture units configured to implement computations for different neural network layers;
- an external storage unit configured to store a weight of an entire neural network; and
- an anti-radiation module configured to separately take a measure for a total ionizing dose (TID) of radiation and a single event effect (SEE), and comprising:
- a TID mitigation submodule configured to adopt an advanced-node complementary metal-oxide-semiconductor (CMOS) technology, avoid using a small-sized standard cell, and reserve a larger timing margin; and
- a SEE mitigation submodule implemented by using two different triple modular redundancy (TMR) modules: a simple TMR module with a triple register and a majority voter, and a complete TMR module, wherein all combinational logic within the complete TMR module is triple, all combinational logic signals are configured as input signals of three majority voters, and outputs of the three majority voters are configured as inputs of the triple register; a feedback output from the register is allowed to be automatically corrected; an automatic correction function is not required for a control path whose state is regularly refreshed and input data that periodically arrives at the anti-radiation low-latency chip; and the automatic correction function is configured for critical data that is not refreshed for a long time after being configured or loaded to ensure that a register error caused by a single event upset is not accumulated over time; wherein each of the streaming architecture units comprises:
- a reshaping buffer configured to store a slice of an input feature map (InFM) or a feature map slice output by a preceding neural network layer;
- a neural network subunit configured to implement a computing engine array and allowed to complete a parallel computation for a convolutional layer or a fully connected layer, wherein the convolutional layer and the fully connected layer use a same loop structure and employ a parallel computation strategy; and
- a weight buffer connected to the external storage unit and configured to extract a weight required for computing a current feature map slice from an external memory;

in the parallel computation, parallelism comes from six dimensions, comprising:
- batch parallelism is to simultaneously group a plurality of image frames into batches to reuse a weight in each layer and minimize an external memory access;
- layer parallelism is achieved in a pipeline manner by starting an $(N+1)^{th}$ layer before ending execution of an $N^{th}$ layer, parallelizes main layers, and merges a remaining layer into the main layers, wherein a quantity of pipeline stages to lower a latency is reduced, and a parameterized register transfer level (RTL) design is realized;
- unrolling of recurrent computations across four levels in the convolutional layer provides four additional concurrent sources, while loop unrolling of a fully connected computation provides four additional concurrent sources: a convolution kernel loop Loop-4, an input channel loop Loop-3, a loop Loop-2 for a scanning operation along an input width and height, and a loop Loop-1 for a multiply-accumulate operation within a convolution kernel window; two outer-layer computation loops of the convolutional layer are unrolled in parallel, namely the convolution kernel loop Loop-4 and the input channel loop Loop-3; and the unrolling of the two outer-layer computation loops only requires caching the slice of the InFM to start a pipeline to perform a convolution operation;
- convolution kernel parallelism is to extract a plurality of convolution kernels from the weight at a time and compute the convolution kernels and a feature map in parallel; and
- input channel parallelism is to extract a plurality of data channels from the InFM at a time and compute the data channels and the convolution kernel in parallel;
- for the parallel unrolling of the two outer-layer computation loops of the convolutional layer, namely the convolution kernel loop Loop-4 and the input channel loop Loop-3, two parameters are defined: a kernel parallelism factor (KPF) and a channel parallelism factor (CPF), which respectively represent quantities of convolution kernels and input channels that are processed within a pipeline stage, wherein the computing engine array implements a two-dimensional parallelism scheme and adjusts a resource overhead of each pipeline stage, wherein the computing engine array comprises a plurality of computing engines, each of the computing engines is configured to process an InFM with CPF channels, and a quantity of computing engines in the computing engine array is determined by the KPF; a parameterized RTL-level intellectual property (IP) is constructed for the computing engine in a hardware-centric bottom-up manner; and the neural network layer is constructed based on the IP to determine impacts of different CPFs and KPFs on an inference latency, a throughput, and a hardware overhead.

2. The anti-radiation low-latency chip for the neural network inference acceleration according to claim 1, wherein a streaming architecture consumes three types of resources: a computing resource, an on-chip memory, and the external memory; and the streaming architecture has two data paths, wherein a first path is configured to horizontally transfer the InFM to a computing unit, and a second path is configured to vertically transfer a weight to the computing unit.

3. The anti-radiation low-latency chip for the neural network inference acceleration according to claim 2, wherein the neural network subunit comprises:
- a parallel computing engine configured to implement parallel acceleration for a convolution computation or a fully connected computation, wherein input data of the parallel computing engine comes from the feature map slice and the weight.

4. The anti-radiation low-latency chip for the neural network inference acceleration according to claim 3, wherein a caching method based on a fine-grained column comprises:
- retaining a part of the InFM on the anti-radiation low-latency chip and caching at least two "columns" before the computation;
- executing, by the convolution kernel immediately after completing a first vertical sliding window operation, a second vertical sliding window operation; and
- after freeing up space occupied by a first slice, starting to cache a next slice to form a next "column", wherein a size required for the reshaping buffer is equal to a size of two "columns".

5. The anti-radiation low-latency chip for the neural network inference acceleration according to claim 4, wherein an adaptive hierarchical storage method comprises: inserting a buffer between a computationally intensive IP array and the external memory, wherein the weight buffer is configured to continuously cache a weight in a dynamic random access memory (DRAM), provide an optional ping-pong buffer at an input end of each layer, and generate a ping-pong buffer when a required weight exceeds a predetermined threshold; and     performing network compression by using parameter pruning, low-rank decomposition, a compact convolutional filter, and knowledge distillation jointly, wherein the parameter pruning selectively removes a parameter based on specific sorting and regularization, and is amplitude-based pruning, which comprises eliminating a redundant weight in a weight tensor by setting a minimum weight value in the tensor to 0; the low-rank decomposition is to estimate an information parameter through matrix decomposition; the compact convolutional filter uses a convolutional filter with a special structure to store the parameter; and the knowledge distillation trains a compact network by using knowledge extracted from a large network.

6. The anti-radiation low-latency chip for the neural network inference acceleration according to claim 5, wherein network quantization is further comprised to transfer an input, a weight, a bias, a sum, and an output of each layer from a floating point to a fixed point; and the network quantization comprises post-training quantization (PTQ) and quantization-aware training (QAT), wherein     the PTQ quantizes a trained network before the trained network is deployed on an inference accelerator, and is configured to apply same quantization to the entire network or set precision of each layer and each parameter type, namely heterogeneous quantization; and     the QAT is configured to limit a performance loss while reducing numerical precision of a network component, wherein during training, a quantized weight and bias are configured in forward propagation and full precision is configured in backward propagation, to drift towards an optimal point during loss minimization.

* * * * *